United States Patent [19]
Berson et al.

[11] Patent Number: 6,104,809
[45] Date of Patent: Aug. 15, 2000

[54] APPARATUS FOR VERIFYING AN IDENTIFICATION CARD

[75] Inventors: William Berson, Westport; Michael D. O'Hare, Fairfield; Kenneth C. Zemlok, Shelton, all of Conn.

[73] Assignee: Pitney Bowes Inc., Stamford, Conn.

[21] Appl. No.: 08/175,001

[22] Filed: Dec. 29, 1993

[51] Int. Cl.[7] ..................................................... H04L 9/32
[52] U.S. Cl. ............................................. 380/23; 235/380
[58] Field of Search .......................... 380/23–25; 235/380

[56] References Cited

U.S. PATENT DOCUMENTS

| | | | |
|---|---|---|---|
| 4,529,870 | 7/1985 | Chaum | 235/380 |
| 4,746,788 | 5/1988 | Kawana | 235/380 |
| 4,879,747 | 11/1989 | Leighton | 380/23 |
| 4,972,476 | 11/1990 | Nathans | 380/23 |
| 4,991,205 | 2/1991 | Lemelson | 380/5 |
| 4,993,068 | 2/1991 | Poisenka | 380/23 |
| 4,995,081 | 2/1991 | Leighton | 380/23 |
| 5,027,401 | 6/1991 | Soltesz | 380/23 X |
| 5,053,608 | 10/1991 | Senanayake et al. | 235/380 |
| 5,095,196 | 3/1992 | Miyata | 235/380 X |
| 5,241,600 | 8/1993 | Hillis | 380/23 |
| 5,259,025 | 11/1993 | Monroe et al. | 380/23 |
| 5,321,751 | 6/1994 | Ray et al. | 380/23 |

*Primary Examiner*—Gilberto Barron, Jr.
*Attorney, Agent, or Firm*—Ronald Reichman; Melvin J. Scolnick; Robert H. Whisker

[57] ABSTRACT

Apparatus for verifying an identification card; the card having an imaged of an object or other entity to be identified on a first portion, and a coded representation of an encrypted signal comprising a representation of the image on a second portion. The apparatus includes a controller, a scanner for reading the coded representation, a decoder for decoding that representation, a decrypter for decrypting the decoded signal and a display for displaying the representation of the information. In one embodiment the information includes an image of the object or other entity to be recognized and the card may be verified by comparing the displayed representation with the image printed on the card while the card is held in a card holding station adjacent to the display so that the image is visible to an operator. The apparatus also includes a replaceable memory, printer, or communications link for recording at least a portion of this text message. In accordance with another aspect of the disclosure the signal is encrypted using a public key encryption system and an encrypted decryption key is appended to the encrypted message, and is recovered by the apparatus to decrypt the message.

16 Claims, 3 Drawing Sheets

APPARATUS FOR VERIFYING AN IDENTIFICATION CARD

RELATED APPLICATIONS

The present application shares elements of disclosure and claims subject matter related to that of commonly assigned U.S. patent application Ser. No. : 07/979,018 now U.S. Pat. No. 5,864,622, by: James R. Marcus, and application Ser. No. 07/979,113, Barry H. Axelrod et al., both filed on Nov. 20, 1992, now U.S. Pat. No. 5,337,358.

BACKGROUND OF THE INVENTION

The subject invention relates to an apparatus for verification of an identification card. The identification card contains an image of an object or other entity to be identified on a first portion of the card in human recognizable form, and a coded representation of an encrypted signal comprising a representation of the image on a second portion of the card. Such a card is disclosed and claimed in the above mentioned, commonly assigned U.S. patent application.

The problem of proving the identity, status or characteristics of a person or other object or entity is ancient. Both history and fiction are full of tales of passwords, tokens, signet rings, etc. intended to prove identity, and the consequences which followed from their loss. In more recent times highly sophisticated instruments which measure fingerprints, voice prints, retinal patterns and the like to identify individuals have been developed. While very useful where a high degree of security is required the expense, complexity, and need for such systems to access a database of characteristics of persons to be recognized, and the need to secure and continually update this database has limited such systems to applications such as controlling access to extremely sensitive areas.

Thus, the most common form for proving the identity of a person is the identification card. Typically, such an identification card will include information about the identity, status or characteristics of the person authorized to process the card, and may include some means, such as a seal, to reduce the possibility of forgery. Frequently, it will be the case that verification of such an identification card will be done at a remote location under difficult circumstances where the person who wishes to validate an identification card, must remain alert and should not be distracted by the validation process. For example, a police officer who has stopped a suspicious motorist should be able to validate an identification card while keeping his or her attention focused on the motorist.

Accordingly, it is an object of the subject invention to provide an apparatus for verification of an identification card in a simple and convenient manner.

BRIEF SUMMARY OF THE INVENTION

The above object is achieved and the disadvantages of the prior art are overcome in accordance with the subject invention by means of an apparatus for verifying an identification card; the identification card having an image of an object or other entity to be identified on a first portion, and a coded representation of an encrypted signal comprising a representation of the image on a second portion. The apparatus includes a controller for controlling the operation of the apparatus and a mechanism for reading the coded representation of the signal from the card. A decoder for decoding the representation of the signal and a decrypter are also included for decoding and decrypting the signal. A display is responsive to the decrypter for displaying the representation of the information; so that the identification card may be authenticated by comparison of the information on the first portion of the card with the displayed representation of the information.

In accordance with one aspect of the subject invention an apparatus for verifying an identification card includes a card holding station for receiving the card, the station including a window so that the image on the card is visible to an operator of the apparatus; a mechanism for reading the coded representation of the signal from the card when the card is in the station; a decoder, responsive to the reading mechanism, for decoding the representation; a decrypter for decrypting the decoded signal to provide a decrypted signal; and a display responsive to the decryptor for displaying the representation of the image, the display being positioned adjacent to the window so that the operator may readily compare the representation of the image and the image.

In accordance with another aspect of the subject invention, the coded representation is in the form of a printed indicia printed on the opposite side of the card from the image, and the reading mechanism includes optics for directing an image of the printed indicia to a scanner.

In accordance with another aspect of the subject invention, the apparatus includes a controller for controlling operation of the apparatus; where the controller operates in two modes. In a first mode when the card is received in the station, the apparatus is controlled to display the decrypted signal representative of the image on the card; and in the second mode the apparatus is controlled to display a menu of further action, and is responsive to input form the operator to execute one of the actions displayed in the menu.

In accordance with still another aspect of the subject invention the encrypted signal is encrypted using an encryption key $E_i$, for a public key encryption system and the corresponding decryption key, $D_i$ is encrypted with an encryption key $E_1$ for the public key encryption system to form an encrypted decryption key $E_1[D_i]$ and the encrypted key is appended to the encrypted signal. Further in accordance with this aspect of the subject invention the apparatus stores a decryption key, $D_1$, corresponding to key $E_1$ and decrypts the encrypted key $E_1[D_i]$ to recover the decryption key, $D_i$, and then decrypts the encrypted signal using the key $D_i$.

DETAILED DESCRIPTION OF PREFERRED EMBODIMENTS OF THE SUBJECT INVENTION

Figure 1:
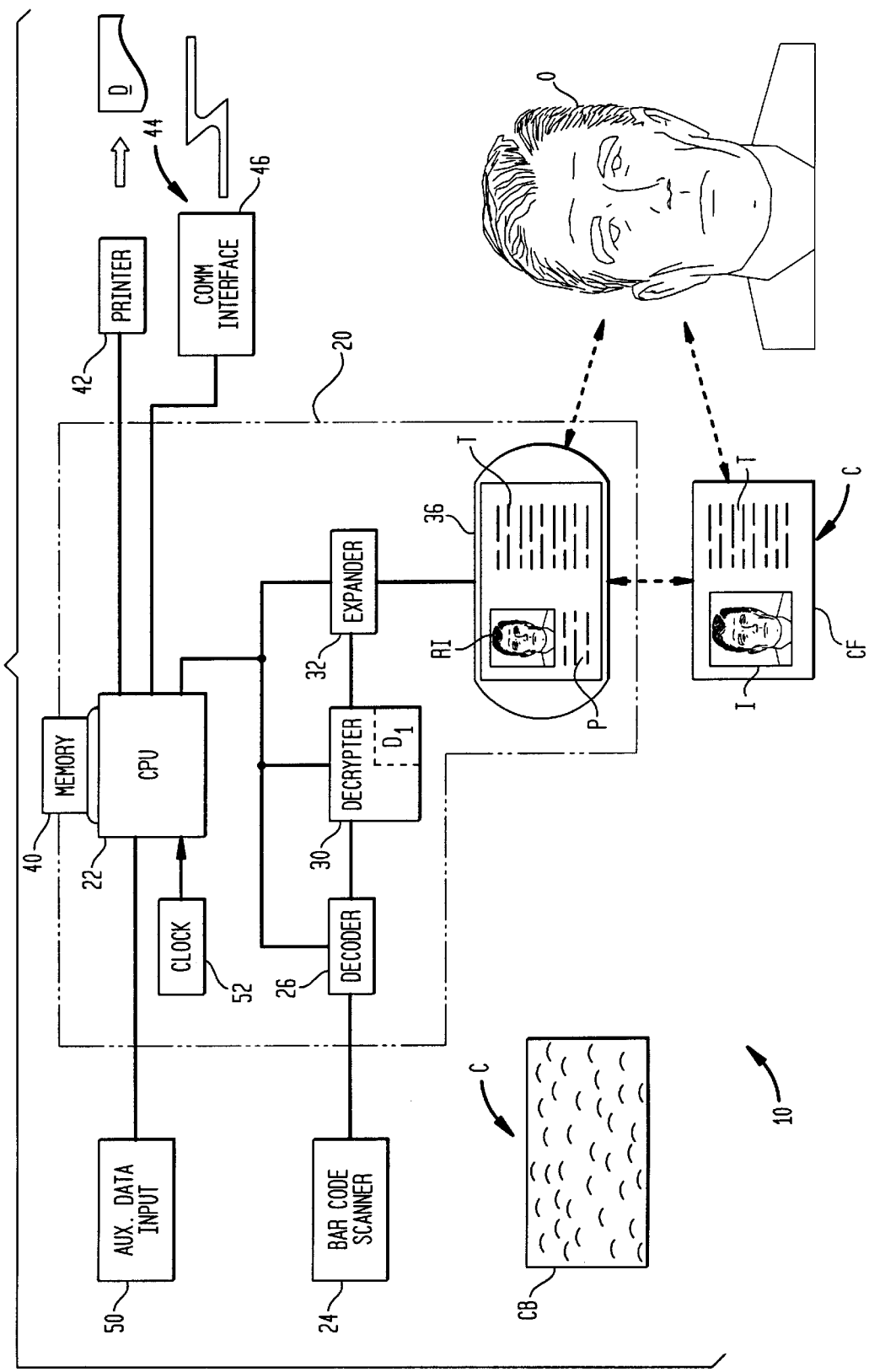
FIG. 1 shows a schematic block diagram of an apparatus in accordance with the subject invention.

Apparatus 10 includes a signal processing system 20 which further includes a central processing unit 22 for control of apparatus 10. Control of apparatus 10 consist of implementation of well known data processing functions including data input, control of peripherals such as displays, printers and communications interfaces, and control of the sequencing of data through various known processes as will be described further below. Such control functions are well within the skill of those in the data processing art and need not be discussed further here for an understanding of the subject invention.

Apparatus 10 is intended for use in conjunction with a card C having a front CF and a back CB. Card C serves as an identification card for an object or other entity, typically a person.

Front CF contains an image of the object or other entity to be identified. Typically, a person O will be identified by an image I and also by a text message T printed on card front CF. Back CB contains a coded representation of an encrypted signal comprising a representation of image I. In accordance with a preferred embodiment of the subject invention the encrypted signal on back CB may also include at least part of text message T. In accordance with another preferred embodiment of the subject invention the encrypted signal comprises a compressed representation of image I.

A more complete description of the construction of card C is provided in the above mentioned, commonly assigned U.S. patent application, which is hereby incorporated by reference, and a further description of the construction of card C is not believed necessary for an understanding of the subject invention.

In operation scanner 24 scans back CB to produce a signal representative of the coded representation on back CB. The signal is input to decoder 26 to be decoded in a conventional manner. Preferably the coded signal will be coded as a two dimensional barcode such as the PDF-417 standard barcode developed by the Symbol Technology Corporation of New York. However, it is within the contemplation of the subject invention that the coded representation may be stored in any convenient medium, for example in memory of a smart card or of a memory card.

After decoding to recover the encrypted signal the encrypted signal is input to decrypter module 30.

The signal may be encrypted using any convenient method of encryption and may be decrypted using the corresponding known, conventional algorithms.

In a preferred embodiment the signal is encrypted using a public key encryption system such as the well known RSA system, using an encryption key $E_i$. The corresponding decryption key $D_i$ is encrypted using another encryption key, $E_1$, for the public key system and the encrypted decryption key, $E_1[D_i]$ is appended to the encrypted message. Decrypter module 30, in accordance with this embodiment, stores the corresponding decryption key, $D_1$, which is used to decrypt key $D_i$, which is in turn used to decrypt the encrypted message.

A more detailed description of this method of authenticating a message or signal is given in U.S. Pat. No. 4,853,961; to: Pastor; for: "Reliable Document Authentication System; issued: Aug. 1, 1989, which is hereby incorporated by reference.

In accordance with a preferred embodiment of the subject invention a representation of image I is comprised in the encrypted signal in a compressed form. Image I may be compressed using any suitable image signal compression algorithm such as the known, commercially available JPEG algorithm. Accordingly, in accordance with this embodiment, after decryption the decrypted signal is expended by expander module 32 to produce a representation RI of image I which is displayed on display 36 together with text message T.

Those skilled in the art will recognize that representation RI will appear somewhat degraded with respect to image I because of the compression. However, with improvements in storage technology, or the use of high capacity storage media, it is within the contemplation of the subject invention that the need for signal compression may be reduced or eliminated and representation RI may correspond substantially exactly to image I.

As is described in the above referenced commonly assigned U.S. patent application display 36 may then be compared to card C and an operator may compare image I to representation RI and the printed text message T to the displayed text message T to authenticate card C, and card C and display 36 may be compared to person O for identification.

In another preferred embodiment of the subject invention the encrypted signal may also include a password known to person O which is displayed on display 36 after decryption as a further means of identification. Of course, in this embodiment the password would not be printed on card front CF.

In another preferred embodiment of the subject invention password T is not displayed but is appended to a record, as will be described further below, to prove that the record has been produced as part of a verification transaction for card C.

In another such embodiment a portion of message T or Image I may be printed by printer 42 in a conventional manner.

In still another such embodiment a portion of message T or Image I may be transmitted over a communication link 44 through communications interface 46. Link 44 may comprise any suitable technology, including but not limited to, modem connection to a telephone line, cellular phone technology, or radio transmission. These technologies too are well known to those skilled in the art and need not be discussed further here for an understanding of the subject invention.

In accordance with another preferred embodiment of the subject invention additional data relating to the authentication transaction may be appended to the record of message T.

For example, in an application of the subject invention where a police officer verifies a driver's license in the process of issuing a traffic ticket it may be desired to append additional data relating to the traffic ticket to the record. In one such embodiment auxiliary data input 50 would comprise a radar gun or similar device for measuring vehicle speed. In another such application, auxiliary data input 50 would comprise a breathalyzer for input of data representative of the blood alcohol content of person O.

In other applications, where it is desired to record the exact geographic position at which a transaction occurred input 50 would comprise a receiver for the Global Positioning System, which is a well known satellite based system for determining geographic position.

In still another such application the time of the transaction may be appended to the record and may be input from system clock 52.

In still another application additional data may be entered manually through a keyboard, keypad, touch screen or other suitable, conventional apparatus for manual entry of data.

Each of these technologies for the input of auxiliary data is well known to those skilled in the art and need not be described further here for an understanding of the subject invention.

Figure 2:
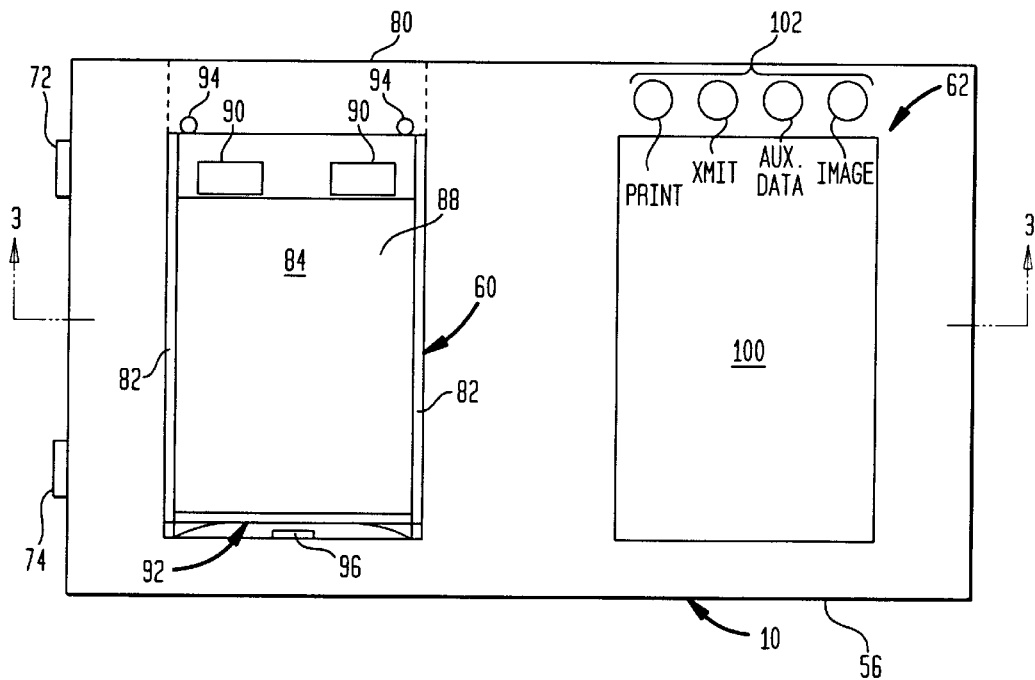
FIG. 2 shows a top plan view of one embodiment of the subject invention.
Figure 3:
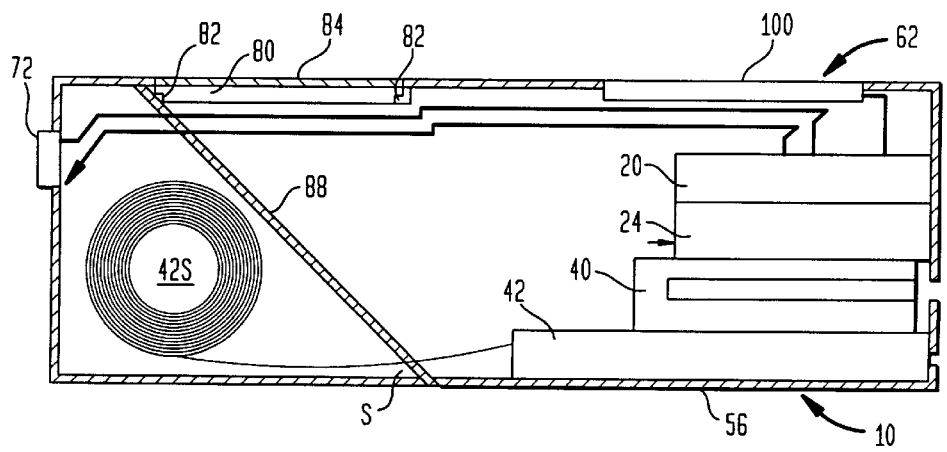
FIG. 3 shows a semi-schematic cross-section of the embodiment of FIG. 2.

Turning to FIGS. 2 and 3 a preferred embodiment of the subject invention which provides simplified operation and is particularly suitable for use in remote locations in shown. In this embodiment apparatus 10 includes a housing 56 having a card holding station 60 for receiving an identification card to be identified and a user interface 62. As can best be seen in FIG. 3, signal processing apparatus 20 and scanner 24 are mounted within housing 56 in a conventional manner. In the embodiment of FIGS. 2 and 3 memory 40 comprises a conventional disk drive and a conventional printer 42, similar to those used to print receipts at automatic teller machines, is also mounted within housing 56. A roll of print stock 42 S is provided to feed printer 42. Connector 72 connects signal processing system 20 to communications interface 46 and connector 74 connects signal processing system 20 to auxiliary data input 50 for operation as described above.

To verify a card, card C is inserted into station 60 through slot 80 where it is received by and guided by guides 82 to assure proper alignment. Card C is inserted so that image I is upwards and visible through window 84. The coded representation on card back CB is reflected by angled mirror 88 for scanning by scanner 24 as will be described further below.

Once card C is inserted in station 60 it is engaged by rollers 90, which are driven by a mechanism (not shown) to assure that card C is properly engaged by station 60. Rollers 90 drive card C into station 60 against resilient stop mechanism 92 over spring mounted stops 94, until stop 92 is driven back against sensor 96. Once sensor 96 detects that card C is fully engaged in station 60, rollers 90 are disengaged in a conventional manner and card C is driven back against stop 94 by resilient stop mechanism 92 to assure, together with guides 82, precise alignment of card C.

In another embodiment of the subject invention rollers 90 and the associated drive mechanism are eliminated and card C is simply placed on top of window 84, which can be a simple opening. In this embodiment registration guides, which can be simple pins or ridges are provided to hold card C in position for scanning.

Details of the mechanism used to aligned card C in station 80 are not considered critical to the subject invention and substantially similar mechanisms are known to those skilled in the art and are used in many applications such as automatic teller machines.

Once card C is engaged in station 60 the coded representation of image I on card back CB is reflected in mirror 88 and may be scanned by scanner 24 in a conventional manner. Mirror 88 is preferably mounted at a 45 degree angle so that the reflected image of the coded representation of image I is not distorted.

Other forms of storage for the coded representation of image I are also within the contemplation of the subject invention. Thus card C can include memory or magnetic strips for storing the coded representation in a conventional manner and station 16 may be provided with appropriate conventional mechanisms for reading the coded representation from such memory or magnetic strips.

In a preferred embodiment print stock 42 S may be conveniently mounted behind mirror 88 and feed to printer 42 slot S in mirror 88, as is shown in FIG. 3. User interface 62 includes display 100, which is preferably a color LCD display or similar display of the type which are known for use on "laptop" computers. User interface 62 also includes a plurality of "soft keys" for selecting various options from a menu displayed on display 100, as will be described further below.

Once card C is engaged in station 60 signal processing system 20 controls scanner 24 to scan the coded representation of image I from its reflection in mirror 88 in an otherwise conventional manner. Once scanned the coded representation is processed in the manner described above with respect to FIG. 1 and displayed on display 100. As can be seen in FIG. 2 display 100 is positioned adjacent to window 84 and representation RI is displayed on display 100 at approximately the same size as image I to facilitate comparison of image I with representation RI.

Once the operator is satisfied that image I does, or does not, conform to representation RI; that is the operator verifies or does not verify card C, the operator may call up a menu of options by pressing one of softkeys 102. Signal processing system 20 responds to display a menu as shown in FIG. 2. In FIG. 2 an operator may print information from card C on printer 42, transmit information from card C through communications link 46 connected to connector 72, input auxiliary data from auxiliary data input 50 through connector 74, or restore representation RI by selecting the appropriate one of soft keys 102. It is of course within the contemplation of the subject invention that menus may be provided and also that sub-menus of additional options may also be provided once a first option is selected.

Figure 4:
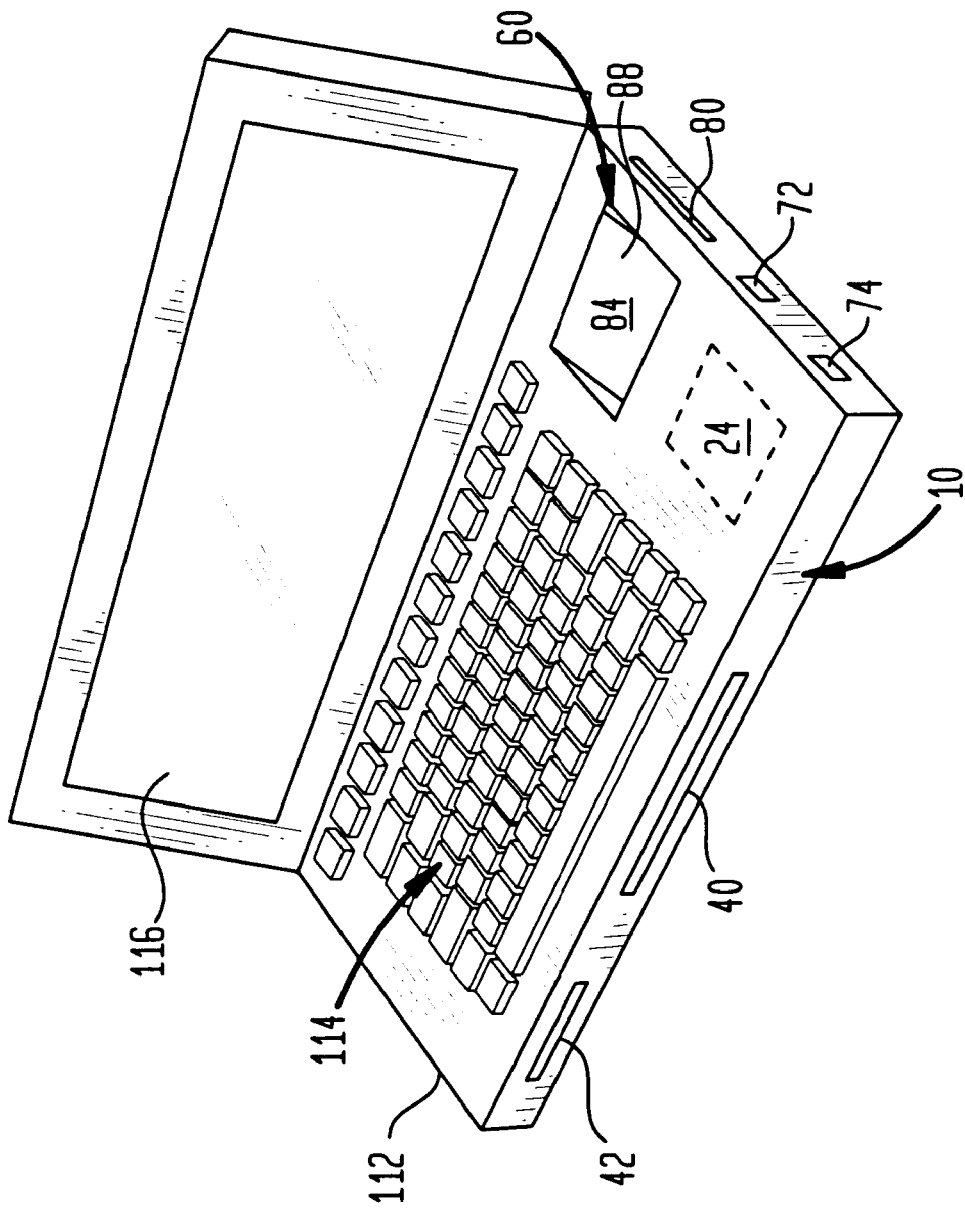
FIG. 4 shows a perspective view of another embodiment of the subject invention.

Turning to FIG. 4 an embodiment of apparatus 10 is shown wherein the functions of signal processing system 20 are comprised in a general purpose computer 112, which is preferably of the well known "laptop" type. Computer 112 is enclosed in a slightly larger housing so that card holding station 60 and scanner 24, as well as printer 42 may be incorporated within the housing. With the commercial availability of powerful microprocessors such as those marketed by the Intel Corporation under the "486" trademark, it is well within the capabilities of those skilled in the art to implement the control, decoding, decryption, and image expansion functions of signal processing system 20 as an application program to run on computer 112.

Preferably the apparatus of FIG. 4 will also be provided with connectors 72 and 74 for connection to communications link 46 and data input 50, though it should be noted that "laptop" computers are commonly provided with modems which may serve as a communications link.

Keyboard 114 and display 116 provide a high capability user interface which allow a system operator to exercise the various capabilities described above when the apparatus of FIG. 4 is operated in a card verification mode.

As can be seen from FIG. 4 window 84 is located adjacent to display 116 to facilitate comparison of image I and representation RI.

Operation of the apparatus of FIG. 4 is essentially identical to that described above, but, since it is run as an application on computer 112, computer 112 can also be used to run other applications such as communications, data searches, word processing etc.

The detailed description of preferred embodiments set forth above has been provided by way of illustration only, and other embodiments of the subject invention will be apparent to those skilled in the art from consideration of the above description and the attached drawings. Accordingly, limitations on the subject invention are to be found only in the claims set forth below.

What is claimed is:

1. An apparatus for verifying an identification card, said card including an image of an object to be identified on a first portion and a coded representation of an encrypted signal comprising a representation of said image on a second portion, said apparatus comprising:

a) a card holding station for receiving said card so that said image is visible to an operator of said apparatus;

b) control means for controlling the operation of said apparatus;

c) means for reading said coded representation of said signal from said card, when said card is received in said station;

d) decoding means, responsive to said reading means for decoding said representation of said signal to provide a decoded signal;

e) decrypting means for decrypting said decoded signal to provide a decrypted signal;

f) display means responsive to said decrypting means for displaying said representation of said image, said display means being positioned adjacent to said image, whereby comparison of said representation of said image and said image is facilitated.

2. An apparatus as described in claim 1 wherein said card holding station further comprises registration means for holding said card in a predetermined alignment.

3. An apparatus as described in claim 2 wherein said coded representation comprises printed indicia, said indicia being printed on a side of said card opposite said image.

4. An apparatus as described in claim 3 wherein said reading means further comprises optical means for directing said an image of said printed indicia through an angel of approximately 90 degrees to a scanner.

5. An apparatus as described in claim 1 wherein said encrypted signal is encrypted using an encryption key, $E_i$, for a public key encryption system.

6. A apparatus as described in claim 5 wherein a decryption key $D_i$, corresponding to said key $E_i$, is encrypted with an encryption key $E_1$ for said public key encryption system to form an encrypted decryption key $E_1[D_i]$ and said encrypted key $E_i[D_i]$ is appended to said encrypted signal, and said decrypting means further comprises:

a) means for decrypting said encrypted decryption key, $E_i[D_i]$ with a corresponding decryption key $D_1$, to recover said decryption key, $D_i$ (semicolor) and, b) means for decrypting said encrypted signal using said key, $D_i$.

7. An apparatus for verifying an identification card, said card including an image of the person to be identified on a first portion and a coded representation of an encrypted signal comprising a representation of said image on a second portion, said apparatus comprising:

a) a card holding station for receiving said card so that said image is visible to an operator of said apparatus;

b) control means for controlling the operation of said apparatus;

c) means for reading said coded representation of said signal from said card;

d) decoding means responsive to said reading means for decoding said representation of said signal;

e) decrypting means for decrypting said decoded signal to provide a decrypted signal, f) display means for displaying images and text; and, g) input means for input of signals by said operator; wherein h) said control means operates in a first mode when said card is received by said station to control said display means to respond to said decrypted signal to display said representation of said images; and i) said control means operates in a second mode to display a menu of further actions, and is responsive to said input means to execute one of said actions.

8. An apparatus as described in claim 7 wherein said coded representation comprises printed indicia, said indicia being printed on a side of said card opposite said image.

9. An apparatus as described in claim 8 wherein said reading means further comprises optical means for directing said an image of said printed indicia through an angel of approximately 90 degrees to a scanner.

10. An apparatus as described in claim 7 wherein said encrypted signal is encrypted signal an encryption key, $E_i$, for a public key encryption system.

11. A apparatus as described in claim 10 wherein a decryption key $D_i$, corresponding to said key $E_i$, is encrypted with an encryption key $E_i$ for said public key encryption system to form an encrypted decryption key $E_i[D_i]$ and said encrypted key $E_i[D_i]$ is appended to said encrypted signal, and said decrypting means further comprises:

a) means for decrypting said encrypted decryption key, $E_i[D_i]$ with a corresponding decryption key $D_i$, to recover said decryption key, $D_i$; (semicolor) and, b) means for decrypting said encrypted signal using said key, $D_i$.

12. Apparatus for verifying an identification card, said card including an image of the person to be identified on a first portion and a coded representation of an encrypted signal comprising a representation of said image on a second portion, comprising:

a) a card holding station for receiving said card, so that said image is visible to an operator of said apparatus;

b) means for reading said coded representation of said signal from said card when said card is received in said station;

c) data processing means for executing a plurality of programs, said data processing means including a display, said display being positioned proximate to said station, and said data processing means operating under control of one of said programs to:

c1) control said reading means to input said coded representation;

c2) decode said coded representation to provide a decoded signal;

c3) decrypt said decoded signal to provide a decrypted signal;

c4) controlling said display in accordance with said decrypted signal to display said representation of said image proximate to said station, whereby comparison of said representation of said image with said image is facilitated.

13. A method of verifying an identification card, said card including an image of an object to be identified on a first portion and a coded representation of an encrypted signal comprising a representation of said image on a second portion, said method comprising the steps of:

a) inserting said card into a card holding station so that said image is visible;

b) reading said coded representation of said signal from said card while said card is in said station;

c) decoding said representation of said signal to provide a decoded signal;

d) decrypting said decoded signal to provide a decrypted signal;

e) inputting said decrypted signal to a display to display said representation of said image proximate to said image while said card is in said station, whereby comparison of said representation of said image and said image is facilitated.

14. A method as described in claim 13 comprising the further step of holding said card in a predetermined alignment after said card is inserted into said holding station.

15. A method as described in claim 14 wherein said reading step comprises reading printed indicia, said indicia being printed on a side of said card opposite said image.

16. A method as described in claim 15 wherein said reading step further comprises directing sad image of said printed indicia through optical means for directing said image through an angel of approximately 90 degrees.

* * * * *